June 21, 1960     B. R. WEILL     2,941,855
TUBULAR MEMBERS AND COUPLING MEANS THEREFOR
Filed March 5, 1958     2 Sheets-Sheet 1
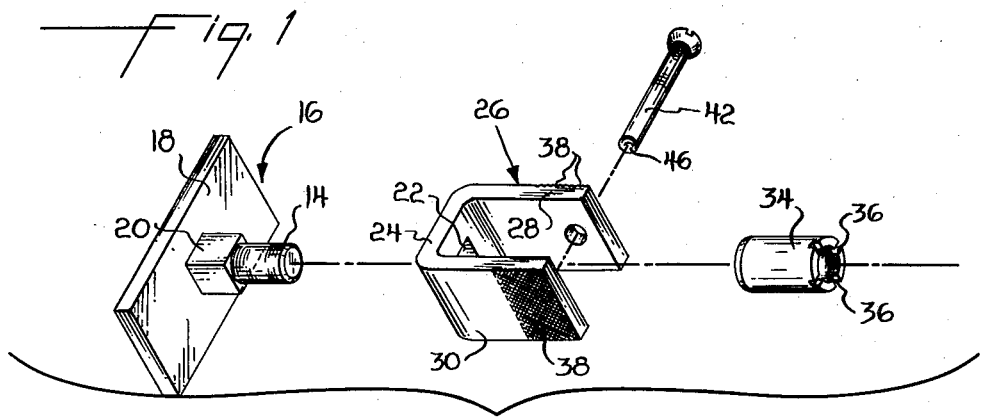
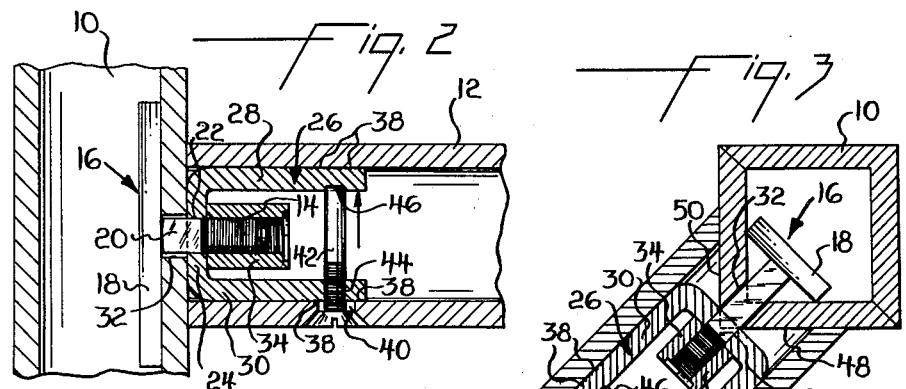
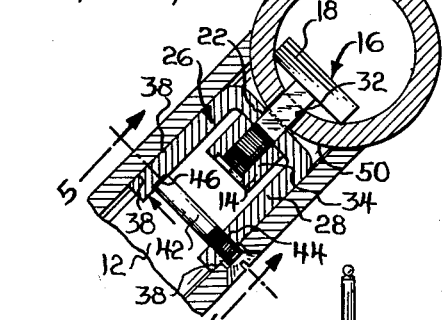
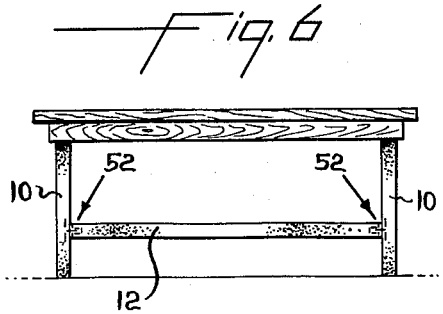
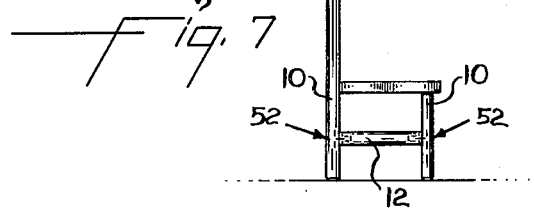
INVENTOR.
Bruno R. Weill
BY
ATTORNEY

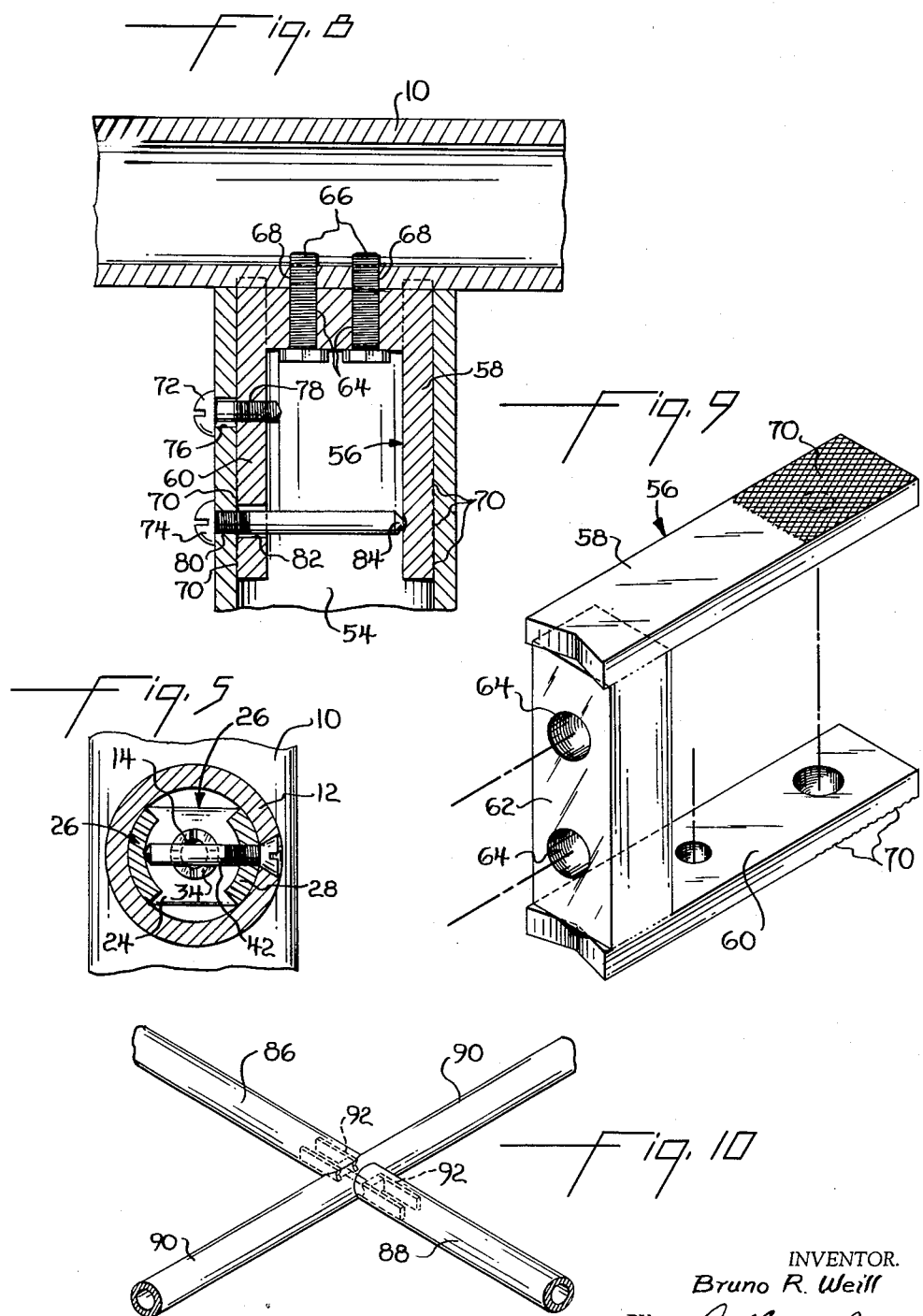

United States Patent Office 2,941,855
Patented June 21, 1960

2,941,855

TUBULAR MEMBERS AND COUPLING MEANS THEREFOR

Bruno R. Weill, York, Pa., assignor to Thonet Industries, Inc., New York, N.Y., a corporation of Delaware Filed Mar. 5, 1958, Ser. No. 719,332

6 Claims. (Cl. 311—105)

This invention relates to improvements in tubular members and coupling means to hold the same connected. More particularly, the invention pertains to connecting one end of a tubular member to a side of another tubular member by novel coupling means, especially for use in the construction of articles of furniture.

The connection of tubular members to each other is achieved quite commonly at present by welding processes, especially for purposes of joining one end of the tubular member to the side of another tubular member. Especially where the tubular members are formed from ferrous material, or any other metallic material which readily is welded, no particular problem is involved other than the finishing of the weldments by grinding or buffing, following which the connected members may be finished in any suitable manner such as by painting, plating, or the like. There are certain popular and desirable metals however which do not lend themselves readily and inexpensively to being welded. Notably among such metals is aluminum.

It has only been in recent years that it has been possible to weld aluminum. Accordingly, the common practice at present in regard to the use of aluminum, especially where the same is adapted to furniture construction, is to connect the various aluminum members solely by mechanical means such as threaded connections, nuts and bolts, and the like. Frequently, these types of connecting means which presently are used in aluminum furniture are complex and unsightly and, hence, are undesirable. This is especially so in regard to connecting the ends of a tubular aluminum member to the side of another tubular aluminum member. Particularly in the manufacture of furniture, welding tubular members together is possible in an effort to achieve a more pleasing appearance, but it is expensive.

The expense of welding aluminum members, tubular or otherwise, to each other, especially in furniture construction, is further increased, when, for example, it is desired to finish the aluminum article by applying a colored finish thereto by anodizing. In the event aluminum members are connected to each other by welding and it is desired subsequently to apply an anodized finish thereto, it is necessary to normalize the connected members after the welding has taken place in order that the temper of the entire aluminum structure is uniform so that the application of the anodized finish likewise will be uniform.

It is the principal object of the present invention to provide tubular members connected by mechanical coupling means and particularly for connecting the ends of tubular aluminum members to the sides of other tubular aluminum members, whereby such connections may be achieved inexpensively, without requiring welding, yet the connection is firm and capable of remaining tight over long periods of time. While the invention is especially applicable to aluminum tubing, such as that used in constructing articles of furniture, the coupling means comprising the present invention are not to be restricted to use with aluminum tubing since the same may be utilized with other kinds and types of tubular material.

Another object of the invention is to provide such coupling means with a minimum number of parts which readily and quickly are assembled, such parts being useful to connect metallic tubing having a relatively wide variety of cross-sectional shapes, and the finished joints are attractive as well as durable.

Still another object of the invention is to provide coupling means for tubular members wherein substantially all of the coupling means are enclosed within the tubular members and, at the most, only one or two screw or bolt heads are visible on the exterior of one of the tubular members when they are connected by coupling means comprising the invention. In most types of furniture construction for example, the surfaces upon which said screw or bolt heads are exposed can be disposed on the lower or bottom surfaces of such tubular members which are not readily visible in the normal use of the furniture for example.

A further object of the invention is to provide such coupling means with a U-shaped bracket disposed within end of one of the connected tubular members and threaded means are associated with said tubular member and U-shaped bracket in such manner that both legs of the U-shaped bracket are clamped firmly to opposite interior wall surfaces of the tubular member which is connected thereby to another by the coupling means comprising the invention.

Details of the foregoing objects, as well as other objects thereof are set forth in the following specification and illustrated in the accompanying drawings comprising a part thereof.

In the drawings:

Fig. 1 is an exploded perspective view illustrating the essential components of one embodiment of coupling means incorporating the principles of the present invention.

Fig. 2 is a fragmentary, sectional view of two exemplary tubular members respectively disposed at right angles to each other and connected together by a coupling means of the type illustrated in Fig. 1.

Fig. 3 is a transverse sectional view of the connection of two tubular members by the embodiment of coupling means shown in Figs. 1 and 2 but wherein both of the tubular members preferably are square or rectangular in cross-section.

Fig. 4 is a view similar to Fig. 3 but showing the connection of one tubular member which is square or rectangular in cross-section to the side of a cylindrical tubular member.

Fig. 5 is a sectional view taken on the line 5—5 of Fig. 4 and illustrating the coupling means of the invention applied to the interior of a cylindrical tubular member, the end of which is connected to the side of another tubular member.

Figs. 6 and 7 represent exemplary articles of furniture, such as a table and chair respectively, to which the coupling means comprising the present invention may be applied to connect bracing members to the legs of such articles of furniture.

Fig. 8 is a sectional view of a slightly different embodiment of coupling means used to connect one end of a tubular member to the side of another tubular member.

Fig. 9 is a perspective view on a larger scale than in Fig. 8 but showing the U-shaped bracket of the coupling assembly illustrated in Fig. 8.

Fig. 10 is a fragmentary view showing an exemplary application of coupling means of the invention used for the connection of tubular members comprising crossbraces for use in furniture construction or otherwise.

One embodiment of coupling means incorporating the principles of the present invention is illustrated in detail in Figs. 1 through 5, wherein a first tubular member 10 is shown in longitudinal cross-section and may comprise for example, the leg of a chair or table. Connected to the outer surface of said first tubular member is a second tubular member 12 which, for example, may comprise a cross brace of a chair or table. It will be seen that the second tubular member extends substantially perpendicularly to the first tubular member 10. By way of further example, the first tubular member 10 may be square in cross-section and the end of the second tubular member 12 abuts the exterior of one wall of the square tubular member 10.

The coupling means comprising the present invention, as illustrated in this embodiment, comprises a threaded shank 14 of a bolt-like member 16 which includes an elongated rectangular head 18. If desired, the threaded shank 14 may include a square end 20 which is complementary to a preferably square hole 22 stamped or otherwise formed within the intermediate member 24 of a U-shaped bracket 26 having similar, substantially parallel opposite legs 28 and 30.

The length of the bolt-like member 16 between the end of the threaded shank 14 and the outer surface of the head 18 is less than the cross-sectional dimension of the square or rectangular interior of the first tubular member 10, whereby the bolt 16 may be inserted longitudinally within the tubular member 10 from one end thereof until the threaded shank 14 may be projected through a hole 32 drilled or punched in one wall of the first tubular member 10. The bracket 26 is then placed in abutment with the exterior of first tubular member 10 so that the threaded shank 14 extends through the hole 22 in the intermediate member 24 of the bracket, whereby a special threaded nut 34 may be screwed upon the threaded shank 14 of the bolt until the bracket 26 is secured firmly to the exterior of the first tubular member 10. The outer end of the special nut 34 may have castellations 36, or other equivalent actuating means formed therein so as to be engageable by a screw driver, Allen wrench, or the like in order to tighten the nuts 34 against the bracket 26.

Preferably, the bracket 26 is formed from suitable strip metal stock which is cut to length and formed into a U-shape as shown in Figs. 1 and 2 especially. The distance between the outer surfaces of the opposite legs of the bracket 26 preferably is only very slightly less than the transverse dimension of the interior of second tubular member 12 which, in the embodiment shown in Fig. 2, preferably is either square or rectangular in cross-section. One end of the second tubular member 12 then is slidably passed over the bracket 26 so as to dispose the legs 28 and 30 of the bracket closely adjacent opposite interior walls of the second tubular member 12. In accordance with the preferred construction of the invention, the outer surfaces of the legs 28 and 30 of the bracket 26 also are roughened as indicated at 38, which may be achieved inexpensively by a stamping operation for example.

One wall of the second tubular member 12 is provided with a slightly elongated slot 40, the elongation extending longitudinally of the member 12, and the outer end of the slot 40 preferably being chamferred as shown in the specific illustration in Fig. 2. A bevel head screw 42, which is threaded at least adjacent the headed end thereof, extends through the slot 40 so that the bevel head thereof is received within the chamfer of slot 40, and said screw is threaded through a threaded hole 44 formed within the leg 30 of bracket 26. The hole 44 is in axial alignment with the slot 40 and the length of screw 42 is such that when the screw head has been fully inserted within the slot 40 for example, and the leg 30 of the bracket is thus screwed tightly against the inner surface of one wall of tubular member 12, the inner end 46 of screw 42 firmly abuts the inner surface of leg 28 of bracket 26, thereby forcing the outer surface of leg 28 into firm engagement with the inner surface of the opposite wall of tubular member 12 as clearly shown in Fig. 2. Hence, both legs of the bracket 26 are placed in firm engagement with opposite inner walls of the second tubular member 12.

The bracket assembly associated with the tubular members 10 and 12 as shown in Fig. 2 comprises a very firm connection therebetween to dispose the end of the second tubular member 12 into close abutting relationship with the exterior of the first tubular member 10 and such connection is of a nature which will remain tight both for long periods of time and under relatively severe usage, especially when adapted to articles of furniture such as the legs of tables and chairs. Further, the elongated slots 40 permit limited latitude in forming or locating such slots within the second tubular member 12, whereby when the screw 42 is threaded into hole 44 in the bracket 26, the end of the tubular member 12 may be manually placed in tight abutting relationship with the exterior of first tubular member 10 before the screw 42 is tightened into final clamping position. Under such circumstances, it will be understod that the width of the slot 40 is only very slightly larger than the diameter of the screw 42, whereby the bevel head of the screw will engage the chamferred walls of the slot to effect firm clamping of the leg 30 of the bracket to the inner surface of the second tubular member 12. Particularly where the coupling means illustrated in Figs. 1 and 2, as described above, is utilized in connecting a cross bar or brace to the leg of a chair or table, wherein the member 12 comprises a cross brace, and the member 10 comprises the leg, the slot 40 may be disposed in the lower or bottom surface of the tubular member 12 when in use, whereby under such circumstances, the head of screw 42 will not readily be visible, as a result of which, no parts of the connecting means will be visible and an attractive junction of the tubular member 12 with the tubular member 10 results. If, for example, the tubular members 10 and 12 are formed of aluminum and it is desired to anodize the outer surfaces thereof, said tubular members may be anodized prior to being connected to each other. Hence, when these two members are connected together by the coupling means described above, such connection may be achieved inexpensively and will result in an attractive junction without incurring the expense of normalizing the members as is necessary when a welded aluminum junction is utilized relative to manufacturing an article of furniture for example. For practical purposes also, the connection effected by the coupling assembly described above is as useful as a welded joint.

To further illustrate the relatively wide range of application of the present invention to tubular members of various cross-sectional shapes, there is illustrated in Fig. 3 another arrangement of the tubular members, wherein the tubular member 10, which is square in cross-section, has connected thereto the second tubular member 12 which extends substantially perpendicularly from one corner of the first tubular member 10. Under such circumstances, the end of second tubular member 12 which abuts the exterior walls of first tubular member 10 will be provided with angularly related surfaces 48 and 50 which are complementary to the exterior of the angular corner of first tubular member 10. Otherwise, however, the arrangement shown in Fig. 3 is similar to that shown in Fig. 2.

Referring to Fig. 4, which is a view similar to Fig. 3, the only difference in the structure of Fig. 4 over Fig. 3 is that the first tubular member 10 is cylindrical, whereby it is necessary to form a concave face 50 on the outer end of square or rectangular tubular member 12 where a neat and attractive connection is desired between the two tubular members 10 and 12.

In Fig. 5, the principles of the present invention are illustrated as being applied to a cylindrical tubular member 12 wherein it is necessary to preferably shape the opposite legs 28 and 30 of bracket 26 so that the outer surfaces thereof are complementary to the inner cylindrical surface of the tubular member 12. Further, the first tubular member 10 may be either square or cylindrical, as shown respectively in Figs. 2 through 4, or any other geometric configuration. However, in order to form a neat connection between the end of second tubular member 12 and the exterior of first tubular member 10, the end of member 12 should be shaped so as to be complementary to the exterior surface of tubular member 10. Hence, this figure serves to illustrate the relatively wide universality of the application of the coupling means comprising the present invention to different shapes of tubular members which are to be connected to each other in such manner that one projects substantially transversely from the other.

To illustrate specific examples of application of the coupling means comprising the present invention to articles of furniture, Fig. 6 shows an exemplary table in which the legs thereof comprise tubular members 10, while a cross member or brace extending between said legs comprises a tubular member 12. In purely diagrammatic manner, the coupling assemblies 52 are shown as connecting the ends of the cross brace tubular member 10 to the exterior vertical surfaces of the legs comprising tubular members 10.

In Fig. 7, wherein an exemplary chair is illustrated, the legs comprise vertical tubular members 10, while the cross pieces or braces for the legs comprise tubular members 12, the ends of the latter being connected to the legs by coupling assemblies 52 embodying the invention.

Although in Figs. 1 through 5, the specific illustration of the invention has included bevel head screws 42, it is to be understood that the use of such screws is not to be regarded as restrictive since, for example, screws with other types of heads may readily be used such as round headed, cap, or Allen screws may be used. The heads of such screws may either be mounted entirely on the exterior of the tubular member 12 or may be counter-sunk thereinto and received within suitable holes or slots formed in one wall of the tubular member 12. Also, particularly in view of the elongated nature of the head 18 of the bolt 16, and especially in view of the fact that the head 18 preferably is longer than the transverse dimension of the interior of the tubular member 10, any substantial rotation of the bolts 16 relative to the tubular member 10 is prevented, whereby it is not necessary to use any special tool to prevent such rotation of the bolt 18.

The embodiment of the invention illustrated in Figs. 1 through 5 preferably is adapted for use with tubular members wherein, for example, the second tubular member 12 either is square or substantially so, circular, or some other similar geometrical configuration. Also, the size of the various elements of the coupling means preferably is selected to be suitably rugged to withstand the use to which the structure of which the tubular members 10 and 12 comprise a part is subjected. Under certain circumstances however, it may be desirable to utilize the coupling means to connect to a tubular member 10, for example, a tubular member 54 which is decidedly rectangular in cross-section. For example, the tubular member 54 may comprise the side rail of a bed such as a hospital bed in which it is desired to connect the side rail substantially permanently to the legs of the head and foot members of the bed. This specific example comprises but one of a number of relatively rugged structures to which the connecting means comprising the present invention may further be applied, the specific illustration of such for the employment of the invention being shown in exemplary manner in Figs. 8 and 9. In Fig. 9 particularly, there is illustrated in perspective form a U-shaped bracket member 56 which, for example, may be fabricated from metallic bar stock of appropriate dimensions. Rather than from the bracket member 56 from a single piece of metal as is the preferred construction of the embodiment shown in Figs. 1 through 5 in regard to the bracket 26, the bracket 56 may be formed by separate leg members 58 and 60 which are connected by an intermediate member 62, the opposite ends of which are welded or otherwise suitably secured to one end of each of the leg members 58 and 60. By way of specific example, the intermediate member 62 may be formed from bar steel approximately three-quarters of an inch square, while the leg members 58 and 60 may be formed from bar steel stock one-quarter inch thick by approximately three-quarters of an inch wide. The latter may be approximately three inches long, while the intermediate member 62 may be approximately 2½ inches long. These dimensions are not to be regarded as restrictive however but merely illustrative. They afford some example however of the rugged nature of the U-shaped bracket 56.

Rather than secure the bracket 56 to the tubular member 10 by bolt means similar to those illustrated in Figs. 1 through 5 however, it is preferred in regard to the structure of Figs. 8 and 9 that intermediate member 62 be provided with a pair of similar holes 64 through which a pair of bolts 66 extend and respectively are threaded within threaded holes 68 in one wall of tubular member 10, regardless of whether the latter is circular, square, or some other geometric configuration in cross-section. The end of the tubular member 54 will be shaped complementarily to conform preferably to the exterior surface of the tubular member 10 in order to afford a tight and neat joint. Preferably, the bolts 66 pass freely through the holes 64 in intermediate member 62. Also, the distance between the outer surfaces of the leg members 58 and 60 of the bracket 56 is only very slightly less than the distance between the inner surfaces of tubular member 54 which slidably receives the legs 58 and 60 of the bracket 56. Further, the outer surfaces of the legs 58 and 60 are provided with roughened areas 70 as shown in Figs. 9 and 10. The end of tubular member 54 which is to be connected by said bracket to tubular member 10 is secured to the bracket 56 by threaded means comprising a pair of bolts, the bolts 72 being shorter than the bolts 74. Rather than rely upon a single bolt to achieve frictionally engaging the opposite legs of the bracket 56 with the inner surfaces of the tubular member 54, the embodiment of the invention shown in Figs. 8 and 9 preferably utilizes said pair of bolts, each bolt respectively securing one leg of the bracket in frictional engagement with opposite interior faces of the tubular member 54. Hence, the shorter bolt 72 extends through a preferably enlarged hole 76 and is threaded into a threaded aperture 78 in leg 60 of the bracket 56. Thus, when bolt 72 is tightened, the leg 60 of the bracket will be firmly and frictionally secured to one inner face of tubular member 54.

The same wall of tubular member 54 which contains the enlarged hole 76, also contains a threaded hole 80 into which the headed end of the longer bolt 74 is threaded. Said bolt also extends through an enlarged hole 82, which preferably is unthreaded, formed within the leg 60 of bracket 56. The inner end 84 of bolt 74 abuts the inner surface of leg 58 of bracket 56 and thereby firmly presses the roughened surface 70 on the opposite side thereof into firm engagement with the wall of tubular member 54 opposite that through which the other end of the bolt 74 extends. By virtue of the enlarged holes 76 and 82 respectively in tubular member 54 and leg 60 of bracket 56, a limited amount of longitudinal adjustment of the tubular member 54 relative to bracket 56 is permitted, thus insuring close abutment of the end of tubular member 54 with the outer surface of tubular member 10. When such abutment has been achieved, the bolts 72 and 74 are tightened into final clamping position of bracket 56 relative to tubular member 54.

Although the bolts 72 and 74 have been illustrated in Fig. 8 as having round heads, it is to be understood that other shapes of heads may be utilized, either mounted exteriorly of tubular member 54 or countersunk thereinto if desired so as to minimize exterior appearances of the connecting means. Where however, the tubular member 54 comprises a cross-brace or sideboards, for example, on a bed, the heads of the bolts 72 and 74 may be mounted in the undersurface thereof so as to minimize the same being exposed to view.

From the foregoing description of the construction shown in Figs. 8 and 9, it will be seen that the embodiment of the invention illustrated therein comprises a very rugged means for connecting one tubular member to another, especially by affording mechanism for firmly and frictionally tightening the legs of the U-shaped bracket 56 respectively against opposite interior side walls of the tubular member 54 so as to resist separation of the tubular member from the other tubular member 10 to which it is connected even under conditions of rugged use and over long periods of time.

In Fig. 10, an exemplary illustration is shown wherein the invention shown in either of the specifically described embodiments may be utilized to connect the ends of a divided cross brace comprising tubular members 86 and 88 to opposite surfaces of another cross brace 90, the coupling assemblies 92 being illustrated diagrammatically and comprising either of the embodiments of the invention specifically illustrated and described herein.

From the foregoing, it will be seen that the present invention comprises coupling means for connecting one end of a tubular member to the exterior surface of another tubular member in closely abutting relationship therewith so that the junction of the two tubular members remain firm and tight under rugged conditions of use for long periods of time. The coupling means may be manufactured relatively inexpensively and assembled with the tubular members with a minimum of operational steps and by using only the simplest of tools such as a screw driver, Allen wrench, or a socket wrench, as required by the type of heads on the various threaded members employed in the coupling assembly. Several embodiments of coupling assemblies are described and illustrated which, while embodying the same basic principles, have somewhat different details of construction respectively lending the use of the coupling assemblies to different conditions of use, some being more rugged than others. The connection effected between two tubular members by the coupling means comprising the invention largely is comparable to a welded connection, yet is devoid of the undesirable characteristics of welded connections in that no additional finishing operations are required in using the coupling means comprising the present invention as distinguished from a welded connection, especially where the connection takes places between aluminum tubular members and, more particularly, where attractive finishes are to be applied to the outer surfaces of such member by anodizing or otherwise.

Although the present invention is especially adapted for use in connecting tubular members used in constructing articles of furniture, such connecting means also is applicable to other fields of use within the limits of the capabilities of the structural elements of the invention.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:

1. A furniture support construction comprising a first tubular member having one end of a second tubular member connected thereto substantially in abutting relationship and substantially perpendicular thereto by coupling means comprising in combination, a U-shaped bracket, means to secure the intermediate portion of said bracket to the outer side surface of said first tubular member, the legs of said bracket being proportioned and spaced apart so as to be received slidably within said one end of said second tubular member, and headed threaded means extending through aligned holes in one wall of said second tubular member and one leg of said bracket, the hole in said one leg of said bracket being threaded to engage the threads of said threaded means and effect clamped securement of said one leg of said bracket to said second tubular member by clamping said member between said bracket leg and head of said threaded means and the inner end of said threaded means abuttingly engaging the inner surface of the other leg of said bracket to force it into firm frictional engagement with the interior wall of said second member adjacent the same, whereby both legs of said bracket respectively are connected firmly and frictionally to opposed interior walls of said second tubular member.

2. A furniture support construction comprising a first tubular member having one end of a second tubular member connected thereto substantially in abutting relationship and substantially perpendicular thereto by coupling means comprising in combination, a U-shaped bracket having strip metal legs sufficiently thick to be threaded, the legs of said bracket being substantially parallel and complementary in shape to the opposite inner wall surfaces of said one end of said second tubular member and disposed slidably into said end and substantially concealed thereby, one leg of said bracket having a threaded hole therethrough, means securing the intermediate portion of said bracket abuttingly against one exterior side surface of said first tubular member, and headed screw means extending through hole means in one wall of said second tubular member in axial alignment with the threaded hole in said one leg of said bracket and threadably engaging said threaded hole to secure said one wall tightly between one inner surface of said bracket leg and the head of said screw means, the other end of said screw means engaging the inner surface of the other leg of said bracket and pressing said other leg tightly against the opposite interior wall of said second tubular member, whereby both legs of said bracket are connected respectively and firmly to opposed interior walls of said second tubular member.

3. A furniture support construction comprising a first tubular member having one end of a second tubular member connected thereto substantially in abutting relationship and substantially perpendicular thereto by coupling means comprising in combination, a U-shaped bracket, the legs of said bracket being substantially parallel and complementary in shape to opposite inner wall surfaces of said one end of said second tubular member and disposed slidably into said end, one leg of said bracket having a threaded hole therethrough, bolt means securing the intermediate portion of said bracket abuttingly against one exterior side surface of said first tubular member, and headed screw means extending through hole means in one wall of said second tubular member in axial alignment with the threaded hole in said one leg of said bracket and threadaby engaging said threaded hole to secure the inner surface of said one wall tightly between said one bracket leg and the head of said screw means, the other end of said screw means engaging the inner surface of the other leg of said bracket to press said other leg tightly against the opposite inner wall of said second tubular member, whereby said tubular members will be secured tightly together with substantially all of the coupling means enclosed within said members.

4. The connected furniture support tubular members and coupling means set forth in claim 3 further characterized by the shank of said bolt means being threaded and shorter than the inner diameter of said first tubular member and having a head engaging the interior of said first tubular member, the head of said bolt means being elongated transversely to the shank of the bolt means and longer than the inner diameter of said first tubular member, whereby the shank of said bolt means is positionable within said first tubular member and extends through a hole therein and said hole in said intermediate portion of said bracket, said bolt means being held against rotation by the engagement of said head thereof with the interior of said first tubular member.

5. The connected furniture support tubular members and coupling means set forth in claim 3 further characterized by said bracket member having hole means through the intermediate portion thereof and the bolt means comprising a headed bolt screwed into threaded holes formed in said first tubular member, the heads of said bolts abutting the inner surface of said intermediate portion of said bracket to secure the same firmly to the exterior of said member.

6. The connected furniture support tubular members and coupling means set forth in claim 5 further characterized by said second tubular member having a pair of holes in one wall thereof spaced longitudinally thereof and the adjacent leg of said bracket having a pair of holes therein substantially in axial alignment respectively with the holes in said member to comprise two pairs of aligned holes, and said headed screw means comprising a headed short screw extending through one pair of said aligned holes and threadably engaging only the hole in the bracket of one aligned pair of said holes and a longer headed screw extending through the other pair of aligned holes into engagement with the other leg of said bracket and threadably engaging only the hole in the tubular member of said other pair of aligned holes, the holes of each pair not threadably engaged by said screw means being larger in diameter than said screw means to permit limited longitudinal adjustment of said second tubular member relative to said bracket.

References Cited in the file of this patent

UNITED STATES PATENTS

| | | |
|---|---|---|
| 658,493 | Trigwell | Sept. 25, 1900 |
| 721,292 | Forster | Feb. 24, 1903 |
| 1,380,042 | Cook | May 31, 1921 |
| 1,460,928 | Tilden | July 3, 1923 |
| 1,671,757 | Allen | May 29, 1928 |
| 1,931,118 | Rowland | Oct. 17, 1933 |
| 2,022,714 | Gallup | Dec. 3, 1935 |
| 2,172,611 | Gerhardt et al. | Sept. 12, 1939 |
| 2,784,812 | Kindorf | Mar. 12, 1957 |
| 2,855,255 | Sonderstrup | Oct. 7, 1958 |